INVENTORS
Jakob Loef
Mathias Schwab

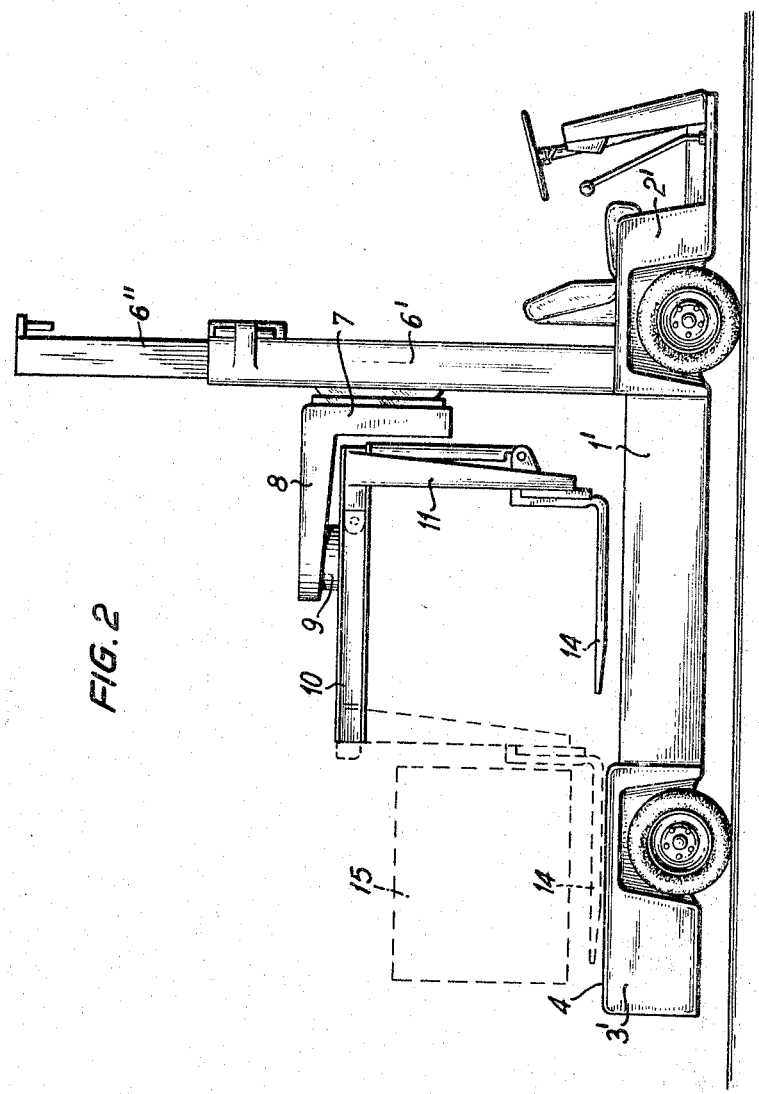

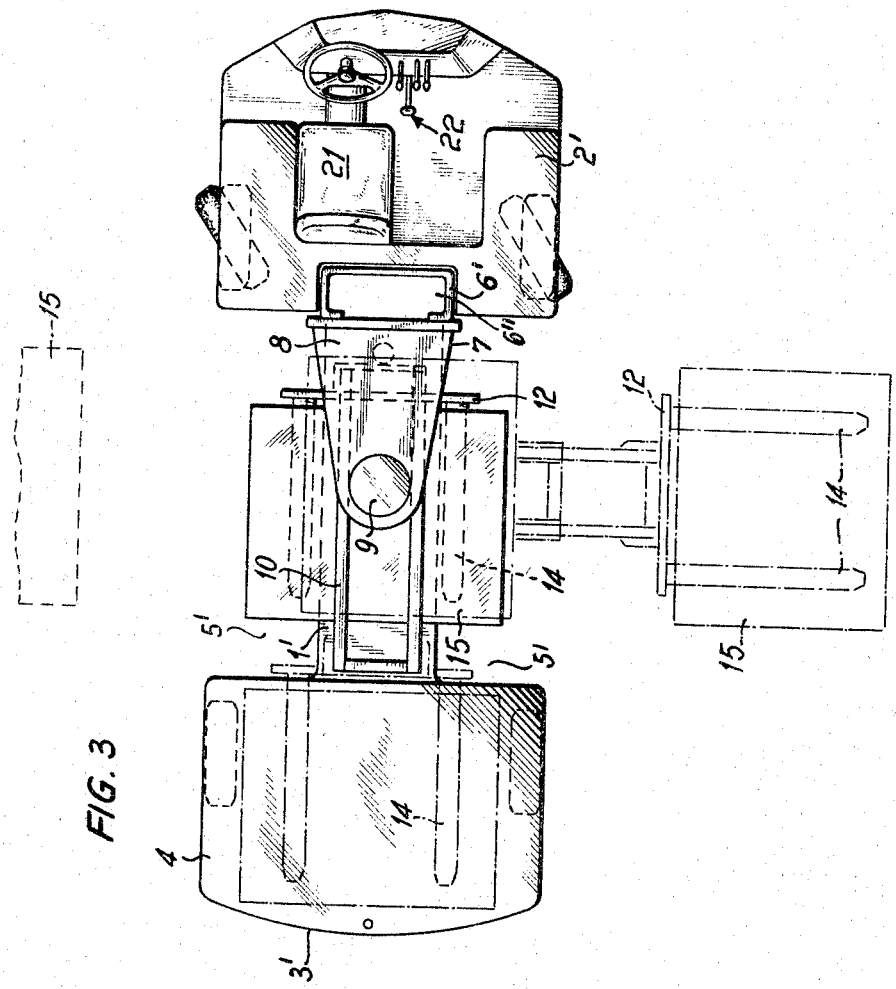

3,323,664
SIDE-LOADING FORK TRUCK
Jakob Loef and Mathias Schwab, Moosburg, Germany, assignors to Steinbock G.m.b.H., Moosburg, Upper Bavaria, Germany, a company of Germany
Filed Apr. 30, 1965, Ser. No. 452,250
Claims priority, application Germany, Dec. 23, 1964, St 23,135
6 Claims. (Cl. 214—75)

This invention relates to fork-trucks, and particularly to a side-loading fork-truck equipped with a load carrying platform.

The object of the invention is the provision of a fork-truck suitable for lifting a load from the ground closely adjacent a side of the truck, for depositing the load on a platform of the truck, and for moving the load to a remote location while supported on the platform.

Another object is the provision of a truck of the type described in which spontaneous swinging movement of a load can be safely avoided while the load is being lifted from the ground to the platform.

With these and other objects in view, as will presently become apparent, the invention, in one of its aspects provides a fork truck whose body essentially consists of wheeled front and rear portions spaced in the direction of truck movement, and connected by a frame portion which defines a recess with the front and rear portions, the recess being laterally open.

An upright post is fixedly mounted on the truck body and supports a vertically movable carriage. A guide frame is mounted on the carriage for angular movement about a normally vertical axis which is offset from the post. A load handling fork is arranged on the frame for guided movement relative thereto in a normally horizontal plane. The fork is dimensioned to be at least partly received in the recess of the truck body. Means are provided for actuating movement of the fork relative to the post.

Other features and many of the attendant advantages of this invention will be readily appreciated as the same becomes better understood by reference to the following detailed description of preferred embodiments when considered with the annexed drawing in which:

FIG. 2 is a side-elevational view of another fork truck of the invention; and

FIG. 3 shows the truck of FIG. 2 in plan view.

Figure 1:
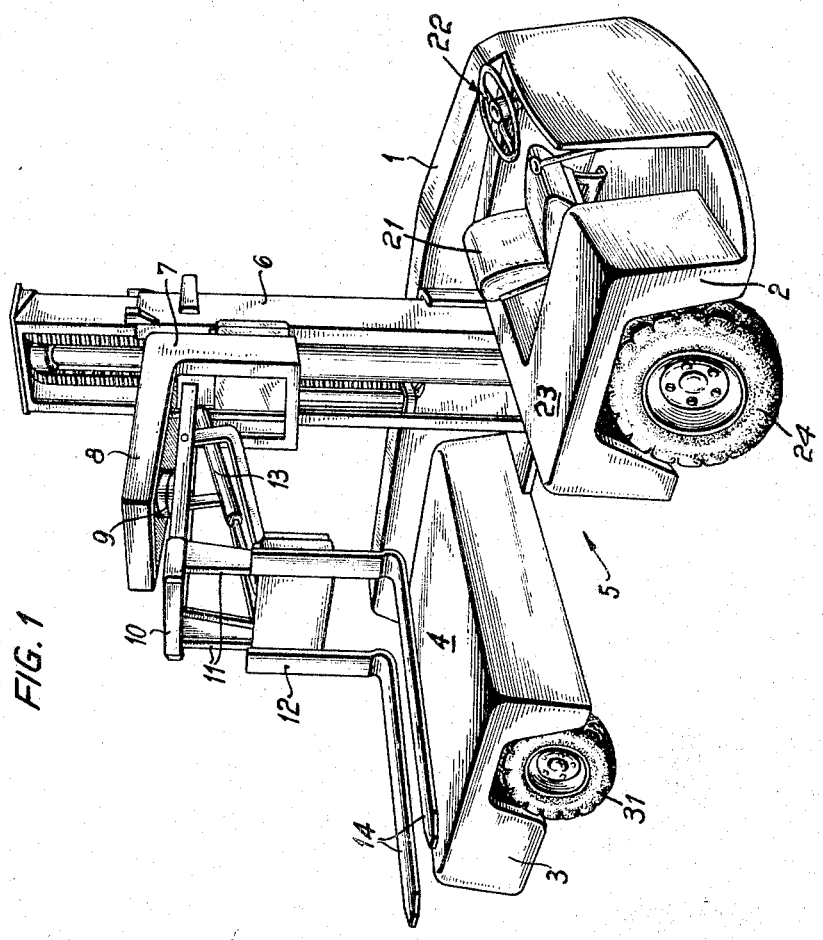
FIG. 1 shows a first embodiment of the invention in perspective view.

Referring now to the drawing in detail, and initially to FIG. 1, there is shown a truck whose body mainly consists of a front portion 2, a rear portion 3, and a narrow frame 1 which connects the front and rear portions.

The front portion of the truck body carries the operator's seat 21 and his controls 22. A small load carrying platform 23 is arranged above one of the front wheels 24. The rear portion 3 has wheels 31 and its top constitutes a flat and unobstructed load carrying platform 4. The front and rear portions 2, 3 are spaced from each other in the direction of truck movement. The frame portion 1 is laterally offset from the common longitudinal axis of the front and rear portions, so that the body of the truck is formed with a recess 5 which is open in one direction transverse of the vehicle axis, and is closed in the other direction by a part of the frame 1.

An upright post 6 is fixedly fastened to the part of the frame 1 in the recess 5 by welding, bolting, or the like. A carriage 7 is secured to the post 6 for vertical movement, and such movement may be actuated by a motor under the operator's control in a manner conventional in itself, and not shown in the drawing.

A bracket 8, integral with the carriage 7, extends from the latter horizontally above the recess 5. It carries a heavy pivot 9 whose vertical axis lies in a common vertical plane with the vehicle axis. The pivot 9 supports a heavy frame 10 equipped with parallel horizontal guideways, not seen in FIG. 1, for two hangers 11 of a fork assembly 12. The fork assembly includes two load-supporting horizontal arms 14.

A hydraulic jack 13 is interposed between the frame 10 and the fork assembly 11 for actuating movement of the latter on the guideways of the frame. The fork truck illustrated does not have power-operated means for turning the fork assembly on the pivot 9, but such means are known and may readily be provided if needed.

The dimensions of the recess 5 and of the arms 14 are such that the arms may be entirely received in the recess if the hangers are fully retracted toward the post 6 by the jack 13, if the carriage is lowered fully, and if the arms 14 maintain the angular position on the pivot 9 which is shown in the drawing. The truck can then be driven into a position in which the open side of the recess 5 is closely adjacent a load to be picked up. The fork arms 14 are then advanced to reach under the load, and to lift the same when the carriage 7 rises on the post 6. Simultaneously, the load is pulled toward the post 6 by the jack 13. When it is lifted sufficiently that the arms 14 clear the top of the platform, and the load has been retracted so that its center of gravity is approximately aligned with the axis of the pivot 9, the fork assembly 12 with the supported load and the frame 10 is swung by hand until the arms 12 are directed toward the rear, and the load is then deposited on the platform 4. The arms 14 may thereafter be retracted to pick up an additional load for deposition either on top of the previously loaded material or on the platform 23. The unloading operation after travel of the truck to another location consists in the reversed sequence of steps.

The modified fork truck of the invention shown in FIGS. 2 and 3 has front and rear portions 2', 3' which are connected by an elongated narrow frame 1' arranged in the central longitudinal axis of the vehicle. The body of the modified truck therefore has two recesses 5' which are open in opposite directions transverse to the vehicle axis on either side of the frame 1'. This arrangement permits the truck to load goods from both sides.

The post of the modified truck consists of two sections in telescopic arrangement. The stationary bottom section 6' is fixedly mounted at the junction of the frame 1' with the front body portion 2'. The movable top section 6" carries the carriage 7 which itself is longitudinally movable on the post section 6". The mechanism for actuating the movements of the post section 6" and of the carriage 7 is concealed within the front portion 1' together with the prime mover which actuates travel of the truck.

As is best seen in FIG. 3, the post sections 6', 6" are of rectangular cross section which prevents rotation of the carriage 7 about the vertical post axis. The bracket 8 extends rearward from the post and is generally located above the frame 1'. The axis of the pivot 9 therefore is centered on the vehicle in all positions of the fork assembly 12. The latter and its supporting frame 10 do not differ significantly from the apparatus described in detail with reference to FIG. 1.

The several positions to which the fork assembly may be moved are partly illustrated in FIG. 3. In the fully drawn position, the fork assembly, which carries a shipping box 15 on its arms 14 is centered on the truck in vertical alignment of its center of gravity with the axis of the pivot 9. It may thus safely be turned by hand for unloading the box 15 on either side of the truck, unloading on the right side only being shown by broken lines indicating the positions of the arms 14 and of the case 15. Broken lines in FIGS. 2 and 3 also show the positions of the case and the arms during deposition of the case on the platform 4.

While the invention has been described with particular reference to specific embodiments, it is to be understood that it is not limited thereto, but is to be construed broadly and restricted solely by the scope of the appended claims.

1. A side-loading fork truck comprising, in combination:
   (a) a truck body having a wheeled front portion, a wheeled rear portion spaced from said front portion in the direction of normal truck movement, and a frame portion extending in said direction and connecting said front and rear portion, said portions of said body jointly defining a recess in said body, said recess being open transversely of said direction;
   (b) an upright post fixedly mounted on said body;
   (c) carriage means vertically movable on said post;
   (d) guide means pivotally connected to said carriage means for angular movement about a normally vertical axis offset from said post;
   (e) load handling fork means guided on said guide means for movement relative thereto in a normally horizontal plane, said fork means being dimensioned to be at least partly received in said recess; and
   (f) actuating means for actuating movement of said fork means relative to said post.

2. A fork truck as set forth in claim 1, wherein at least one of said front and rear portions is formed with a platform adapted to carry a load.

3. A fork truck as set forth in claim 1, wherein said front and rear portions have a common central axis extending in said direction, and said frame portion and said post are offset from said axis in a common transverse direction.

4. A fork truck as set forth in claim 1, wherein said front and rear portions have a common central axis extending in said direction, and said frame portion and said post extend in a vertical plane through said axis, said recess extending from said frame portion in one transverse direction, and said portions of the truck body defining yet another recess extending from said frame portion in a direction opposite to said one transverse direction and open in said opposite direction.

5. A fork truck as set forth in claim 1, wherein said post has a first elongated portion fixedly mounted on said body, and a second elongated portion secured to said first portion in telescoping engagement for vertical movement relative thereto, said carriage means being movably mounted on said second portion.

6. A fork truck comprising, in combination:
   (a) a truck body having a front portion, a rear portion spaced from the front portion in the direction of truck movement, and a frame portion elongated in said direction and connecting said front and rear portions, said portions jointly bounding a recess in said body, said recess being open transversely of said direction;
   (b) an upright post fixedly mounted on said body and secured against movement relative thereto;
   (c) a carriage mounted on said post for vertical movement;
   (d) a bracket horizontally extending from said carriage;
   (e) a pivot on a portion of said bracket spaced from said carriage and from said post;
   (f) a guide frame connected by said pivot to said bracket for movement relative to the bracket in a normally horizontal plane;
   (g) a fork assembly mounted on said frame for guided movement toward and away from said pivot in a normally horizontal path,
      (1) said fork assembly including arm means adapted to be received in said recess; and
   (h) actuating means for actuating said guided movement.

References Cited

UNITED STATES PATENTS

| | | | |
|---|---|---|---|
| 3,190,473 | 6/1965 | Loef | 214—730 |
| 3,202,242 | 8/1965 | Dolphin | 214—730 |

GERALD M. FORLENZA, *Primary Examiner.*

F. E. WERNER, *Assistant Examiner.*